United States Patent Office 3,417,772
Patented Dec. 24, 1968

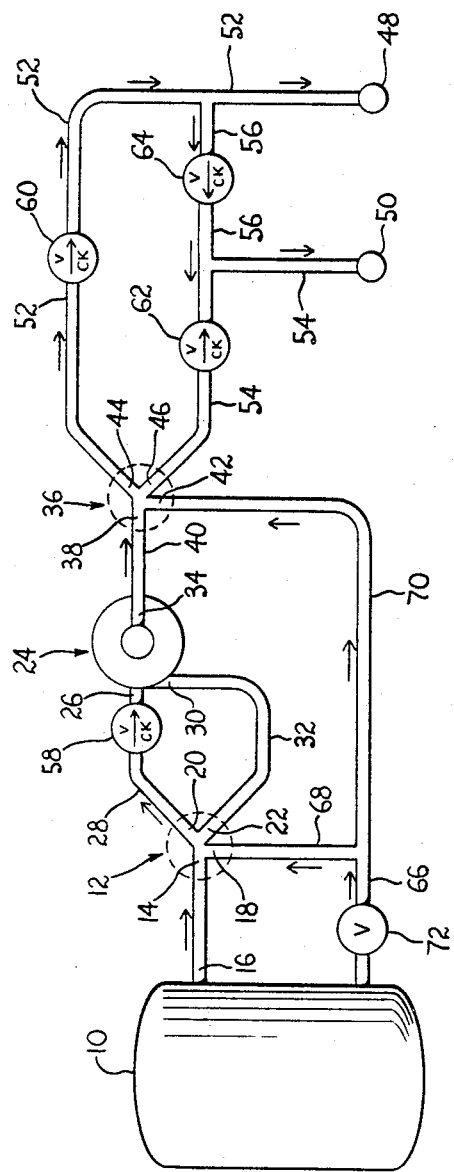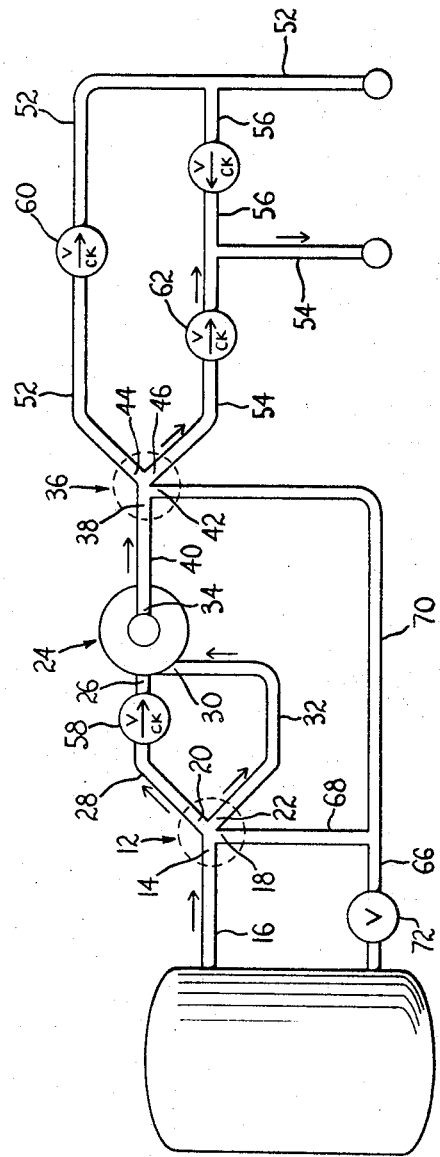

3,417,772
ROCKET MOTOR PROPELLANT
INJECTION SYSTEM
John I. Schaeffer, Towaco, N.J., assignor to Thiokol
Chemical Corporation, Bristol, Pa., a corporation of
Delaware
Filed Nov. 9, 1966, Ser. No. 593,050
1 Claim. (Cl. 137—81.5)

This invention relates to rocket motors and more particularly to a simplified system for injecting liquid propellant into the combustion chamber of a rocket motor.

In the operation of certain rocket motors it is necessary to provide for two thrust levels, namely, a thrust level of greater magnitude which is termed "boost thrust" and a thrust level of lesser magnitude which is termed "sustain thrust." This step thrust requirement has previously been met by forming two rows of propellant injection orifices in the wall of the combustion chamber of a rocket motor and by arranging a slide valve so that it can be moved over one of said rows at a selected time, boost thrust of the rocket motor being attained when propellant is allowed to enter the combustion chamber through both rows of the injection orifices and sustain thrust being attained when propellant is allowed to enter the combustion chamber through only one row of the injection orifices.

Although the aforedescribed slide valve mechanism performs the required throttling function well, it is complex in construction and difficult to fabricate. In accordance with the present invention, however, step throttling of a rocket motor is achieved by means of stream interaction devices that are simple in design and easy to assemble. Furthermore, the propellant injection system disclosed herein is relatively insusceptible to handling and operating damage and hence is reliable to use.

It is accordingly an object of this invention to provide an improved system for injecting liquid propellant into the combustion chamber of a rocket motor.

Another object of the invention is to provide a rocket motor propellant injection system that is uncomplicated in design and thus inexpensive to manufacture.

An additional object of the invention is to provide a rocket motor propellant injection system that is durable in construction and reliable in operation.

The above and other objects are attained by a preferred embodiment of the invention that is described in the following specification, in which reference is made to the accompanying drawings wherein:

FIGURE 1 is a schematic representation of the components of the preferred embodiment of the invention, illustrating the direction of flow of propellant therethrough under boost thrust conditions; and FIGURE 2 is the same schematic representation of the components of the preferred embodiment, illustrating the direction of flow of propellant therethrough under sustain thrust conditions.

Throughout the specification and the drawings, like reference numbers designate like parts.

As illustrated in the drawings, the preferred embodiment of the invention comprises a liquid propellant supply reservoir 10 that is pressurized by conventional means (not shown) during the operation of the rocket motor with which the embodiment is used. It is to be understood that this reservoir and other components of the preferred embodiment described hereinafter are carried within the casing of a rocket motor, and that the relative size of said reservoir and components is not as represented in the drawing. A first wall attachment amplifier, generally designated by the number 12, has a first inlet 14 that is communicatively connected to reservoir 10 by means of a first conduit 16, a second inlet 18 that is also communicatively connected to said reservoir by conduits that will be described hereinafter, and first and second outlets 20, 22. The operation of wall attachment amplifier 12 will be explained hereinafter.

A vortex amplifier, generally designated by the number 24, has a first inlet 26 through which fluid can be injected radially into the interior thereof, this first inlet 26 being communicatively connected to first outlet 20 of wall attachment amplifier 12 by means of a second conduit 28. Vortex amplifier 24 also has a second inlet 30 through which fluid can be injected tangentially into the interior thereof and into impingement with fluid injected into first inlet 26, this second inlet 30 being communicatively connected to second outlet 22 of wall attachment amplifier 12 by means of a third conduit 32. Fluid injected into either or both of the inlets 26, 30 is discharged through an outlet 34. The operation of vortex amplifier 24 will be explained hereinafter.

A second wall attachment amplifier, generally designated by the number 36, has a first inlet 38 that is communicatively connected to the outlet 34 of vortex amplifier 24 by means of a fourth conduit 40, a second inlet 42 that is communicatively connected to reservoir 10 by conduits that will be described hereinafter, and first and second outlets 44, 46. The operation of second wall attachment amplifier 36 will be explained hereinafter.

In accordance with the invention, the combustion chamber of a rocket motor is preferably formed with a plurality of injection orifices arranged in two rows. For the sake of simplicity, two rows 48, 50 of injection orifices are represented in the drawings by two circles designated by the same numbers, and in the actual embodiment of the invention row 48 is communicatively connected to first outlet 44 of second wall attachment amplifier 36 by means of a fifth conduit 52 and a manifold (not shown) and row 50 is communicatively connected to second outlet 46 of the same wall attachment amplifier by means of a sixth conduit 54 and another manifold (not shown). A seventh conduit 56 communicatively connects the aforesaid fifth and sixth conduits.

Disposed in second conduit 28 is a first check valve 58; in fifth conduit 52 a second check valve 60; in sixth conduit 54 a third check valve 62; and in seventh conduit 56 a fourth check valve 64. These check valves permit fluid flow in the respective conduits in the directions indicated by the arrows within the circles which represent the check valves, and prevent fluid flow in the opposite directions.

In the construction of the preferred embodiment of the invention, the direction of liquid propellant flow through first and second wall attachment amplifiers 12, 36 is controlled by flow control means comprising an eighth conduit 66 one end of which is communicatively connected to reservoir 10 and the other end of which is communicatively connected to a pair of branch conduits 68, 70, the latter being communicatively connected to second inlet 18 of first wall attachment amplifier 12 and to second inlet 42 of second wall attachment amplifier 36, respectively. Disposed in conduit 66 is a valve 72 which can be opened to permit flow of liquid propellant from reservoir 10 to said second inlets 18, 42 simultaneously, or which can be closed to cut off this flow. It will be readily apparent that the liquid propellant injected into said second inlets 18, 42 could be supplied from a separate supply tank.

As will be understood by persons skilled in the art of stream interaction devices, first and second attachment amplifiers 12, 36 can be designed so that fluid flow through the outlets thereof can be controlled by the injection of fluid into their second inlets 18, 42. Thus, first wall attachment amplifier 12 is arranged so that selective variation in the volume of propellant injected into second inlet 18 directs the propellant injected into first inlet 14 through first outlet 20 only, through second outlet 22 only, or through both said first outlet 20 and second outlet 22.

Second wall attachment amplifier 36 is arranged so that when a relatively high volume of propellant is injected through second inlet 42 propellant injected into first inlet 38 is discharged through first outlet 44, with no flow of propellant through second outlet 46 at this time. However, the arangement of second wall attachment amplifier 36 is such that when the volume of propellant injected into second inlet 42 is reduced, propellant injected into first inlet 38 is discharged only through second outlet 46.

As has been mentioned hereinbefore, reservoir 10 is pressurized during the operation of the rocket motor in which the aforedescribed embodiment of the invention is used. During the boost thrust phase of operation of the rocket motor, valve 72 is opened so that propellant is injected by the pressure in reservoir 10 not only into first inlet 14 of first wall attachment amplifier 12 but also into second inlet 18 of said first wall attachment amplifier and into second inlet 42 of second wall attachment amplifier 36. The volume of propellant injected into second inlet 18 can be made such that the path of propellant flow is out of first wall attachment amplifier 12 through outlet 20 and through second conduit 28 to first inlet 26 of vortex amplifier 24, readily into said vortex amplifier 24 and out of its outlet 34 into fourth conduit 40, and thence through first outlet 44 into second attachment amplifier 36. Since propellant is injected into second inlet 42 of wall attachment amplifier 36, the propellant flows into fifth conduit 52, seventh conduit 56, and a portion of sixth conduit 54, with the result that propellant is injected into the combustion chamber of the rocket motor through both the injection orifice rows 48, 50 thereof. The above-described path of propellant flow through the components of the described embodiment of the invention during boost thrust is illustrated in FIGURE 1.

Operation of the rocket motor at a lower, or sustain, thrust can readily be accomplished by closing valve 72 to reduce the flow of propellant to the second inlets 18, 42 of first and second wall attachment amplifiers 12, 36, respectively. The pressure in reservoir continues to force propellant into first inlet 14 of first wall attachment amplifier 12, but the latter is arranged so that when a reduced volume of fluid is injected into second inlet 18 thereof the injected propellant is discharged through both first outlet 20 and second outlet 22. The portion of the propellant that enters second conduit 28 is injected radially into vortex amplifier 24 through first inlet 26 thereof, whereas the portion of the propellant that enters third conduit 32 is injected tangentially into said vortex amplifier through second inlet 30 thereof and into impingement with the propellant injected through said first inlet 26. Because of the impingement of the two propellant streams entering vortex amplifier 24, flow through the vortex amplifier is impeded and thus reduced, or throttled. It is to be understood that the throttling effect of first wall attachment amplifier 12 can be achieved by arranging the latter so that when there is a reduced volume of propellant injected into second inlet 18 thereof, all of the propelant injected into first inlet will flow through second outlet 22 into third conduit 32 and tangentially into vortex amplifier 24. The degree of throttling attained will depend upon the amounts of propellant injected radially into vortex amplifier 24 and tangentially into the same. Under sustain thrust conditions of operation, there is also a reduced volume of propellant injected through second inlet 42 of second wall attachment amplifier 36, and, as previously mentioned, the latter is arranged so that under this condition of reduced fluid flow through second inlet 42 propellant entering said second wall attachment amplifier through first inlet 38 thereof is discharged through second outlet 46 rather than through first outlet 44. The propellant then flows through sixth conduit 54 to injection orifice row 50, check valve 64 blocking the flow of propellant to injection orifice row 48.

It will be recognized that the arrangement of the components of the preferred embodiment of the invention permits propellant flow to the combustion chamber of a rocket motor to be effectively maintained at either boost or sustain thrust levels, and that the selection of the desired flow rate depends upon the actuation of a single valve, namely, valve 72. A particular advantage of the disclosed fluidally controlled propellant injection system is that the pressure drop across injection orifice rows 48, 50 is substantially the same at both thrust levels, whereas the pressure drop across injection orifice rows in an injection system employing a conventional slide valve can vary by a factor of three at boost and sustain thrust levels.

Obviously many modifications of the present invention are possible in the light of the above teachings. It is therefore to be understood the scope of the invention is limited only by the terms of the appended claim.

What is claimed is:

1. A fluidally controlled system for injecting liquid propellant into the combustion chamber of a rocket motor, comprising:

a liquid propellant supply reservoir;

a first wall attachment amplifier having first and second inlets and first and second outlets and arranged so that selective variation of the volume of fluid injected into said second inlet directs the fluid injected into said first inlet through said first outlet only, through said second outlet only, or through both said first and second outlets;

a first conduit communicatively connecting said first inlet of said first wall attachment amplifier with said liquid propellant supply reservoir;

a vortex amplifier having a first inlet through which fluid can be injected radially into the interior thereof, a second inlet through which fluid can be injected tangentially into the interior thereof and into impingement with fluid injected into said first inlet, and an outlet;

a second conduit communicatively connecting said first inlet of said vortex amplifier with said first outlet of said first wall attachment amplifier;

a third conduit communicatively connecting said second inlet of said vortex amplifier with said second outlet of said first wall attachment amplifier;

a second wall attachment amplifier having first and second inlets and first and second outlets and arranged so that selective variation of the volume of fluid injected into said second inlet directs fluid injected into said first inlet through said first outlet only or through said second outlet only;

a fourth conduit communicatively connecting said first inlet of said second wall attachment amplifier with said outlet of said vortex amplifier;

a fifth conduit communicatively connecting said first outlet of said second wall attachment amplifier with said combustion chamber;

a sixth conduit communicatively connecting said second outlet of said second wall attachment amplifier with said combustion chamber; a seventh conduit communicatively connecting said fifth and sixth conduits;

a first check valve disposed in said second conduit and adapted to prevent fluid flow from said vortex amplifier to said first wall attachment amplifier;

a second check valve disposed in said fifth conduit and adapted to prevent gas flow from said combustion chamber to said second wall attachment amplifier;

a third check valve disposed in said sixth conduit and adapted to prevent fluid flow from said first outlet of said second wall attachment amplifier to said second outlet of said second wall attachment amplifier;

a fourth check valve disposed in said seventh conduit and adapted to prevent fluid flow from said sixth conduit to said fifth conduit; and flow control means for simultaneously injecting fluid into said second inlets of said first and second wall attachment amplifiers at a selected time.

References Cited

UNITED STATES PATENTS

| | | | |
|---|---|---|---|
| 3,229,460 | 1/1966 | Jones | 137—81.5 |
| 3,266,241 | 8/1966 | Jennings | 60—258 |
| 3,267,946 | 8/1966 | Adams et al. | 137—81.5 |
| 3,276,259 | 10/1966 | Bowles et al. | 137—81.5 XR |
| 3,302,935 | 2/1967 | York | 137—81.5 XR |
| 3,336,754 | 8/1967 | Lange et al. | 60—258 |

SAMUEL SCOTT, *Primary Examiner.*

U.S. Cl. X.R.

60—258